(12) United States Patent
Troitski (10) Patent No.: US 6,768,080 B2
(45) Date of Patent: Jul. 27, 2004

(54) METHOD FOR PRODUCTION OF LASER-INDUCED DAMAGE IMAGES WITH SPECIAL CHARACTERISTICS BY CREATING DAMAGES OF SPECIAL SPACE SHAPE

(75) Inventor: Igor Troitski, Henderson, NV (US)

(73) Assignee: Troitski, Henderson, NV (US)

( * ) Notice: Subject to any disclaimer, the term of this patent is extended or adjusted under 35 U.S.C. 154(b) by 208 days.

(21) Appl. No.: 10/016,013

(22) Filed: Dec. 17, 2001

(65) Prior Publication Data

US 2003/0111446 A1 Jun. 19, 2003

(51) Int. Cl.⁷ .............................................. B23K 26/00
(52) U.S. Cl. ............................. 219/121.69; 219/121.68
(58) Field of Search ...................... 219/121.69, 121.68, 219/121.67, 121.85

(56) References Cited

U.S. PATENT DOCUMENTS

| | | | | |
|---|---|---|---|---|
| 3,715,734 A | * | 2/1973 | Fajans | |
| 3,778,361 A | * | 12/1973 | Courtney-Pratt | |
| 4,092,518 A | * | 5/1978 | Merard | |
| 4,564,739 A | * | 1/1986 | Mattelin | |
| 4,567,104 A | * | 1/1986 | Wu | 428/410 |
| 4,642,701 A | * | 2/1987 | Maeda et al. | |
| 4,806,454 A | * | 2/1989 | Yoshida et al. | |
| 4,843,207 A | * | 6/1989 | Urbanek et al. | |
| 4,997,747 A | * | 3/1991 | Yoshida et al. | |
| 5,158,845 A | * | 10/1992 | Waitts et al. | |
| 5,206,496 A | * | 4/1993 | Clement et al. | |
| 5,272,309 A | * | 12/1993 | Goruganthu et al. | |
| 5,473,475 A | * | 12/1995 | Sweatt et al. | |
| 5,575,936 A | * | 11/1996 | Goldfarb | |
| 5,637,244 A | * | 6/1997 | Erokhin | |
| 5,728,994 A | * | 3/1998 | Hutton | 219/121.69 |
| 5,786,560 A | * | 7/1998 | Tatah et al. | |
| 5,886,318 A | * | 3/1999 | Vasiliev et al. | |
| 5,982,806 A | * | 11/1999 | Yamaguchi et al. | |
| 6,087,617 A | * | 7/2000 | Troitski et al. | |
| 6,322,958 B1 | * | 11/2001 | Hayashi | |
| 6,333,485 B1 | * | 12/2001 | Haight et al. | |
| 6,333,486 B1 | * | 12/2001 | Troitski | |
| 6,392,683 B1 | * | 5/2002 | Hayashi | |
| 6,399,914 B1 | * | 6/2002 | Troitski | |
| 6,417,485 B1 | * | 7/2002 | Troitski | |
| 6,426,480 B1 | * | 7/2002 | Troitski | |
| 6,442,974 B1 | * | 9/2002 | Paananen et al. | 65/30.13 |
| 2002/0046994 A1 | * | 4/2002 | Miesak | 219/121.69 |
| 2003/0015509 A1 | * | 1/2003 | Gissinsky et al. | 219/121.85 |

FOREIGN PATENT DOCUMENTS

| | | | |
|---|---|---|---|
| EP | 743128 | * | 11/1996 |
| JP | 39893 | * | 3/1977 |
| JP | 233086 | * | 9/1989 |
| RU | 2008288 | * | 2/1994 |
| SU | 321422 | * | 1/1972 |
| SU | 1838163 | * | 8/1993 |
| WO | 96/30219 | * | 3/1996 |

OTHER PUBLICATIONS

John F. Ready, Effects of high–power laser radiation, Academic Press, New York–London, 1971, pp. 288–293.

\* cited by examiner

*Primary Examiner*—M. Alexandra Elve (57) ABSTRACT

A method for production of laser-induced damage images, which are able to change their optical characteristics depending on bopresight allocation and which are looked like iridescent images laying out white light incident upon them. These images are created by laser-induced damages of special space form. These damages are produced by creation of two areas (the first and the second) surrounding the pre-set points: the first area is essentially large than the second area, having form like desirable damage. The pulse laser radiation creates under critical electron density in the first area and initiates the breakdown in the second area.

14 Claims, 3 Drawing Sheets

(3 of 3 Drawing Sheet(s) Filed in Color)

METHOD FOR PRODUCTION OF LASER-INDUCED DAMAGE IMAGES WITH SPECIAL CHARACTERISTICS BY CREATING DAMAGES OF SPECIAL SPACE SHAPE

FIELD OF THE INVENTION

The present invention relates to methods for producing high quality laser-induced damage images (in particularly multicolor images) in transparent objects using high power laser radiation on basis of the breakdown phenomenon.

BACKGROUND OF TH INVENTION

A number of techniques for creating a variety of patterns on the surface and inside of transparent substrates using pulsed laser radiation are well known.

One publication disclosing such techniques is the Russian invention # 321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 3,715,734 to Fajans discloses a three-dimensional memory storage unit, which is prepared by carbonizing selected spots in a block of polymethylmethacrylate by means of a steeply converging laser beam. The energy of the beam is applied in pulses of such duration and at such intensity that carbonization takes place only at the focal point of the beam.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a preprogrammed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. patent application Ser. No. 09/354,236 to Troitski discloses a laser-computer graphic system for generating portrait and 3-D reproductions inside optically transparent material. Accordance to the invention, production of a portrait of the same resolution like a computer image is made by using a multi-layer picture. Points of every layer are arranged so that the distance between adjacent etch points are equal to the minimal distance between etch points that can be provided without the breakage of the material. Every layer is parallel with respect to the portrait plane, and distance between parallel planes is set equal to minimal distance at which the breakage of the material does not occur.

U.S. patent application Ser. No. 09/557,306 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. patent application Ser. No. 09/583,454 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

Laser-induced damage image is a plurality of damages inside a transparent material created by a pulsed laser beam, which is periodically focused at predetermined points of the material. These damages become visible by scattering the exterior light. It is clear, that visual appeal of a damage image is defined by scattering signature of its damages. In turn the scattering signature of the laser-induced damage depends on damage space shape. Creating laser-induced damages of special shape, it is possible to produce images with special optical characters.

However, analyzing the methods of all aforementioned patents it is clear that they disclose creation of laser-induced damage images by damages with shapes approximated by spheres with star internal structure. Such damages are created by sharp focusing of the laser beam, what on the one hand, gives the fine radiation localization in the pre-set point but on the other hand, does not give a chance to create damage with special space shape.

The invention discloses methods for creating laser-induced damage images with special optical characteristics by damages of special space shapes.

SUMMARY OF THE INVENTION

The present invention has its principal task to provide a method for production of laser-induced damage images with special optical characteristics containing laser-induced damages of special space shape.

One or more embodiments of the invention comprise a method for producing the laser-induced damages of special space shape by creation of two areas: the first area has under critical electronic density; the second area has electronic concentration, which increases critical electronic density; the second area has a form corresponding to the right damage shape; the first area has general form but involves the first area.

One or more embodiments of the invention comprise a method for producing the laser-induced damages, which transform scattering light depending on the bopresight allocation and light direction.

One or more embodiments of the invention comprise a method for producing the laser-induced damages like parts of planes, which together with a flat surface of an article lay out white light incident upon them into spectrum.

One or more embodiments of the invention comprise a method for producing an iridescent laser-induced damage by specific space distribution of laser radiation creating arrangement of cracks inside the damage, which lay out white light incident upon them in to spectrum.

One or more embodiments of the invention comprise a method for producing separate fine internal splits, created by breakdown phenomenon, with reduced distance between them.

One or more embodiments of the invention comprise a method for creating different color of different areas of a laser-induced damage image by controlling orientation of laser-induced damages inside the areas.

One or more embodiments of the invention comprise a method of laser-induced damage production (without sharp focusing laser beam) by passing the first power laser beam through the pre-set point (with possible using self-trapping phenomenon) and localization of damage area by cross with the second low-power laser beam.

One or more embodiments of the invention comprise a method for production of laser-induced damages containing an arrangement of separate planes forming small diffraction gratings. This method based on breakdown phenomenon permits to produce diffraction gratings inside whatever transparent material.

DESCRIPTION OF THE DRAWINGS

The file of this patent contains at least one drawing executed in color. Copies of this patent with color drawings are provided to the Patent and Trademark Office with payment of the necessary fee.

DETAILED DESCRIPTION OF THE INVENTION

The invention comprises methods for generating laser-induced damage images inside optically transparent materials by damages of special forms. In general, the invention relates to methods in which laser energy is utilized to generate laser-induced damages based on the breakdown phenomenon.

A laser-induced damage image is a set of damages created by the breakdown initiated by a pulsed laser beam. These damages become visible by scattering the exterior light.

One or more embodiments of the invention comprise a method for producing the laser-induced damage images with special characteristics by damages of special space shapes.

One or more embodiments of the invention comprise a method for producing the laser-induced damage images by the damages, which are parts of planes. The damages reflect light, which has mirror and diffuse components, and therefore its brightness depends on bopresight allocation and direction of light. Controlling the orientations of the planes during image production it is possible to create images, which are changed depending on the bopresight allocation and light direction. Using scattered light and changing viewing direction a spectator can see brightness modification of separate damages. Using direct light and changing viewing direction a spectator can see forthcoming of damages and disappearance other damages. Thereby, if all known methods disclose creation of images containing etch points, which do not change their relative brightness and can not disappear during observations, the image production by damages of plane forms gives a chance to create laser-induced damages with special visual dynamical characteristics.

Figure 1:
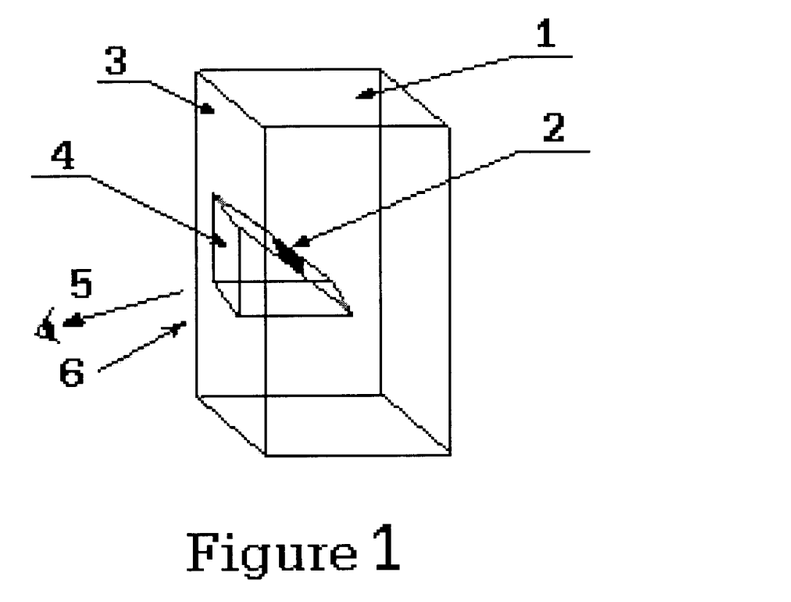
FIG. 1 illustrates how a flat damage inside optically transparent material can be seen into a part of a prism: 1—an article, 2—a flat damage, 3—the front surface of the article, 4—a fictitious prism, 5—the bopresight allocation, 6—the light direction.

Another very important advantage of the flat damages is their ability to lay out white light incident upon them into spectrum. Reference is now made to FIG. 1, which shows that a flat damage can be seen into a part of a prism: one prism side contains the flat damage but another its side is a front surface of the transparent material. Due to dispersion of light the prism lays out the incident ray into spectrum, so that the damage can look like iridescent etch point.

Image production by laser-induced damages with forms of semi-sphere or semi-cylinder permits increase brightness separate points by focusing incident light.

One or more embodiments of the invention comprise a method for producing the laser-induced damage images by the damages, which contain small diffraction gratings. Using the damages it is possible to produce multicolor laser-induced damage images and changing their lengths and orientations to control brightness of separate image parts.

Thereby, creation of damages with special space shape has great advantages and permits to produce laser-induced damage images with new unique characteristics. However, to create the damages by known methods is not possible. First of all, it is necessary to depart from the sharp focusing of the laser beam, what is used in all aforementioned patents disclosing the methods for creating laser-induced damage images. The sharp focusing localizes the laser radiation in an area, which is essentially smaller than the size of the desired damage area and therefore to create damage with the right form by sharp focusing is not possible. If the sharp focusing is replaced, for example, by the long focusing, so that the breakdown area becomes like desirable damage area, the damage becomes very large with shapeless structure. The problem is very large laser energy is accumulated in an area for a short time and all this energy is allocated inside the spot very compactly. Consequently, a very strong shock wave due to laser-supported deflagration is driven into the solid. The shocked stress is very larger than the fracture threshold and it induces long cracks with relatively independent orientation. These cracks result in a star structure of visible damage. To reach the desirable result—creation of a damage with the desirable shape it is necessary to work out special method considering the physical characteristics of the breakdown phenomenon.

It is known, that the process of laser-induced damage development has several stages:

1) creation of an initial low-density free electron concentration;
2) buildup of this electron concentration until a density of $10^{18}$ to $10^{19}$ cm$^{-3}$ is reached;
3) absorption of the remainder of the laser pulse by the resulting plasma;
4) an increase in temperature to a value of several thousands of degrees;
5) the generation of an initial thermally-induced sound wave which is the response of the medium following the thermal expansion of the central region during the laser heating pulse, which sound wave propagates outward;
6) the expansion of created liquid at a rate much slower than the speed of sound;
7) the generation of a pressure-induced sound wave as the liquid forms higher pressure with gradients of the order of several GPa/$\mu$m; and
8) the formation of cracks at the liquid/solid interface (velocities in the range of 1 to 2 km/s).

In case of sharp focusing laser beam, plasma area has a very small value and consequently a strong burst is happened. The burst generates two predominant types of cracks. One type is the largest and longest on average. These cracks have a relatively independent orientation. Another type is a large number of very fine shorter "hair-like" cracks, which are relatively isotropic in distribution. In the beginning of the process, cracks of first type are generated. Once these cracks have been made, the remaining pressure is relieved by a large number of relatively small cracks. All this process continues several tens of nanoseconds.

Figure 2:
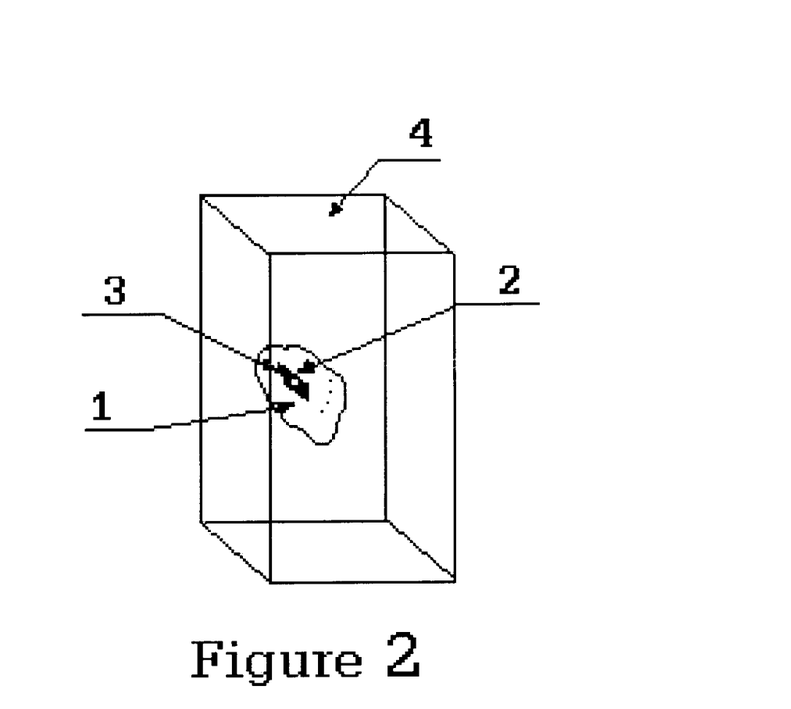
FIG. 2 illustrates creation of two areas surrounded the pre-set points: 1—the first area with under critical electron density, 2—the second area having the form of desirable damage, 3—the pre-set point, 4—a transparent material.

One or more embodiments of the invention comprise a method for producing the laser-induced damages of special space shape, which is based on the creation of two areas with increased (high) electron concentration: the first area has undercritical electron concentration (smaller than $10^{18}$) and its volume is essentially larger than the volume of the first area; the second area is placed inside the first area and electron density of the second area increases the critical electron concentration by a negligible manner. Consequently, the breakdown is created only inside the second area, which is placed inside the first area and therefore, at the beginning, the shock wave extends through the area in which electron concentration is only a little smaller than critical density. The area of high electron density passes the shock wave without creating large cracks. The shock wave breaks up as square of the distance and therefore if the first area is substantially larger than the second area the shock wave, which reaches the clear material, is not very strong and only very fine shorter "hair-like" cracks can arise. Consequently, after the breakdown plasma declines the general damage is created only in the second area and therefore has shape like second area form. The short "hair-like" cracks condition the diffuse light component.

FIG. 2 illustrates creation of two areas surrounded the pre-set points: 1—the first area with undercritical electron density, 2—the second area having the form of desirable damage, 3—the pre-set point.

Figure 3:
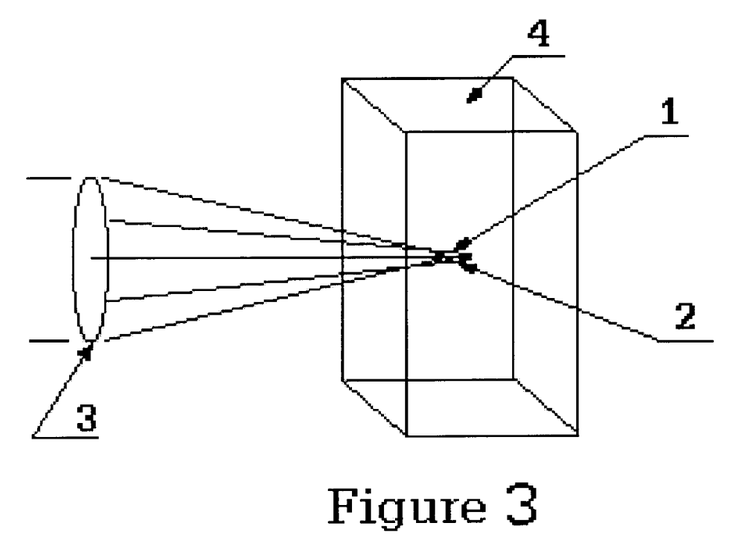
FIG. 3 shows the creation of spherical damage without star structure by an optical system combining sharp and long focusing of laser beam: 1—the long focusing area in which electron density is smaller critical, 2—the sharp focusing area in which breakdown is created, 3—an optical system realizing sharp and long focusing of laser beam, 4 a transparent material.

In particularly, the method can be used for creating damages with sphere shape without star structure. Reference is now made to FIG. 3. Laser radiation is focused at a point so that focal spot increases the damage area essentially; laser energy increases the breakdown threshold (by a negligible manner) only inside damage area; laser energy of the rest area is a little smaller than the breakdown threshold. For example such energy distribution can be created by combination of sharp and long focusing of laser beam.

It is also important to note that using long-focal-length optics, it is possible to create a long area, in which grate power laser radiation can be localized. In particularly, it is possible to create some conditions, under which an intense laser beam passing through a material can propagate without appreciable spreading. This occurs because the high electric field associated with the laser beam increases the index of refraction of the material (which may well be homogeneous when the light is not present). Since the laser beam is most intense at its center, the increase in index will be maximum at the center of the beam; the propagation at the beam center will be slowed relative to the edges. This focusing effect may trap the beam and prevent it from spreading. Essentially the beam produces its own waveguide (the phenomenon of self-trapping or self-focusing of laser beam).

The simplified expression between the laser power P and a beam diameter D, when the self-trapping phenomenon is happened is:

$$P=(\pi D^2/4)(n_0 E^2 c/8\pi)>(1.22\lambda)^2 c/64 n_2,$$

where c and $\lambda$ are the velocity of light and the wavelength, E is the field strength, n is the index of refraction: $n=n_0+n_2 E^2$.

This self-trapping phenomenon can be used for creating laser-induced damages by two laser beams.

One or more embodiments of the invention comprise a method for producing the laser-induced damages of special space shape by two laser beams. The method is as follows:

Step 1: the first laser beam with energy, which is a little smaller than the breakdown threshold, is directed into the transparent material so it passes through the preset point; preferably, that the laser power P and a beam diameter D fulfill to self-trapping conditions;

Step 2: the second laser beam with energy, which is smaller than the breakdown threshold but the total energy of the first and the second beams in their intersect place exceeds the breakdown threshold, is passes through a spatial light modulator and is directed into the transparent material so that it is perpendicular to the first beam and passes through the right point;

Step 3: the spatial light modulator forms the special space distribution of the second laser beam so that the intersect area of the first and the second beams has desirable shape.

Figure 4:
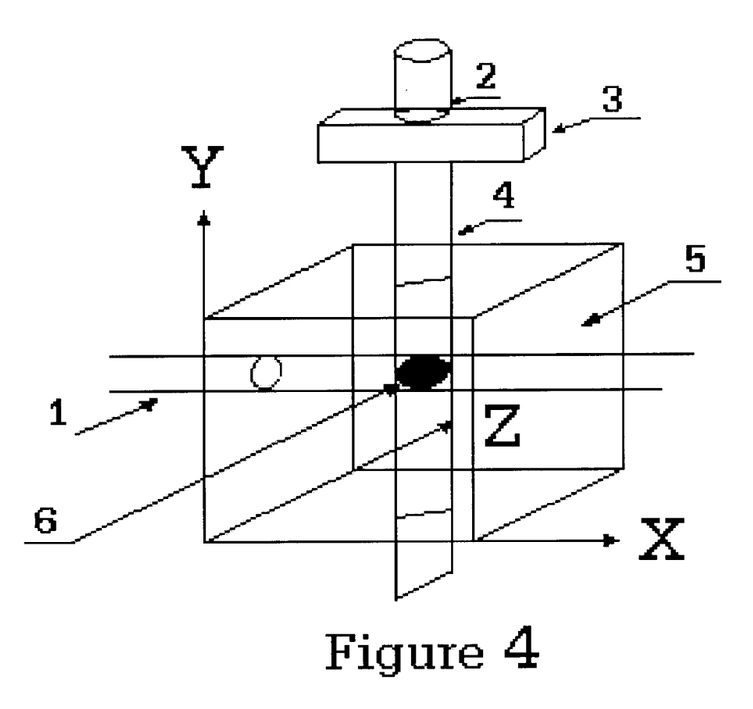
FIG. 4 illustrates creation of the flat damage by two incoherent beams: 1—the first beam; 2—the second beam; 3—the space modulator transforming the second beam into the flat beam; 4—the flat beam; 5—the transparent material; 6—flat damage.

Step 4: the creation of a laser-induced damage in the pre-set point of the transparent material is controlled by moving the first beam perpendicular to XZ plane and the second beam perpendicular to YZ plane (FIG. 4).

Step 5: the sizes of a laser-induced damage are controlled by diameters of the first and the second beams.

For example, FIG. 4 illustrates creation of the flat damage (a damage which is a patch of plane). In this case the first beam is a cylinder and the second beam after the space modulator is flat. If the space modulator transforms the second beam into sickle-shape, the damage like a small cylindrical lens is produced.

One or more embodiments of the invention comprise a method for producing separate fine internal splits, created by breakdown phenomenon, with reduced distance between them. Since two separate laser beams are used, it is possible to create special conditions, under which pressure diffusion occurs without jumping of structure. For this the first laser beam creates the initial electron density, which does not exceed but is nearly to the critical electron density corresponding to the start of the breakdown. This condition is determined the parameters of the first laser beam (a pulse duration, a wavelength, a power value). In the development, the energy of the second laser beam can have minimal value to generate the breakdown at the cross section. Thereby the method permits to generate the breakdown in an area contained inside a place with electron density, which is nearly equal to the critical density, and to generate to the breakdown in the area by addition of minimal energy. The second factor permits to create fine (sheet material) internal split. Preliminary generation of high electron density and minimal energy inside desirable area gives a chance to create separate cracks so that distance between adjacent the cracks is substantially smaller than the average minimum distance $d_0$ for the transparent material.

The damages containing the set of internal split planes lay out white light incident upon them into color spectrum like diffraction gratings and can be used for production of multicolor laser-induced damage images.

One or more embodiments of the invention comprise a method of variation of color spectrum for different damages. According to this method the second beam should turn round its axis so that orientation of the damage produced for this position differs from the previous damage orientation. Varying an angle direction of white light incident upon a laser-induced damage image containing such damages it is possible to create dynamical color variation of different areas of the image.

It is important to note that there are Patents, which disclose using several laser beams. For example, U.S. Pat. No. 5,272,309 to Goruganthu et al. discloses a method in which a first beam and a second laser beam with a longer wavelength than the first laser beam are directed at a first metal member in contact with a second metal member. At the ambient temperature the first member has high absorption of energy from the first laser beam but low absorption of energy from the second laser beam. After discontinuing the laser beams a solid bond forms between the members. U.S. patent application Ser. No. 09/679,201 to Troitski discloses method and laser system for production small laser induced damages by two laser beams. But these patents do not teach how using two laser beams to create damage desirable shape in whatever transparent material.

Systems for creating special shape damages in accordance with the methods described above can be assembled by the known optical equipment. For example, optical equipment for using several separate laser beam is disclosed in Japanese patent publication 52-39893 to Hosokawa et al., in Japanese patent publication 1-233086 to Kogyo et al., in U.S. Pat. No. 4,564,739 to Mattelin. The spatial light modulation can be made by both a special space light modulator (as it is disclosed U.S. Pat. No. 5,473,475 to Sweatt et al.) and directly in a laser (as it is disclosed U.S. Pat. No. 5,982,806 to Yamaguchi et al.). Control of sizes of a laser-induced damage by variation of diameters of the first and the second beams can be made by the device of switching a scanning beam diameter described in U.S. Pat. No. 4,642,701 to Maeda et al.

However, combination of these devices can give desirable effect (creation of laser-induced damages with special space shape) only if all steps of the methods disclosed above are made and laser parameter specifications described above are satisfied.

Apart from creation of diffraction grating by two incoherent beams it is possible to create small diffraction grating on basis of the breakdown phenomenon by using general holographic systems.

One or more embodiments of the invention comprise a method for creation of a small diffraction gratings contained inside laser-induced damages by two coherent laser beams. In principle, methods of diffraction grating production by two coherent beams, generating, in particularly, by division of the basic power laser beam is well known.

U.S. Pat. No. 3,778,361 to Courtney-Pratt discloses a method in which an opalescent effect is created artificially in suitable bulk material by the interference of two beams directed into the material at the Bragg angle. Optical energy is thus concentrated along desired planes and a planar alteration of refractive index along these planes is achieved. Suitable bulk materials include polymethyl methacrylate.

U.S. Pat. No. 4,806,454 to Yoshida et al. discloses a method for the formation of a diffraction grating on a substrate using a holographic technology and an etching technique, wherein the periodicity of the pattern of the diffraction grating can be changed at will by a change of the light-path length of one of the two light fluxes from a holographic exposing system.

U.S. Pat. No. 4,997,747 to Yoshida et al. discloses a method for the formation of a diffraction grating on a substrate using a holographic technique.

U.S. Pat. No. 5,158,845 to Waitts et al. discloses a decorative multi-colored material and method of making same using rainbow gratings simultaneously evidence different color patterns, which change through the color spectrum.

All aforementioned patents disclose methods for creating diffraction grating on a material surface or inside special suitable bulk materials, for example, including polymethyl methacrylate.

One or more embodiments of the invention comprise a method for creating diffraction grating on basis of the breakdown phenomenon inside whatever transparent material by using two coherent beams.

A method for creation of a laser-induced damage, containing a diffraction grating by two coherent beams is as follows:

Step 1: division of the basic power laser beam into two laser beams so that the energy level of the first laser beam is negligible smaller that the breakdown threshold and the energy level of the second beam is determined so that the energy of the interference bands at the intersect place of the first and the second beams exceeds the threshold breakdown by negligible manner.

Step 2: the first laser beam is directed inside the transparent material so that it passes through the pre-determined point.

Step 3: the second laser beam is "tightened" so that its diameter is not larger than the desirable laser-induced damage size after that it is directed inside the transparent material so that it passes through the pre-set point and converges at an angle $\theta$ with the first beam.

Step 4: the angle value $\theta$ is controlled so it is not larger than the value $\theta_0 = 2\arcsin(\lambda/2d_0)$, where $\lambda$ is the wave length of the laser radiation, $d_0$ is the minimal distance between adjacent internal splits—if the distance is smaller than $d_0$, the adjacent internal splits form integrated damage.

Step 5: brightness of the laser-induced damage is controlled by changing the value of the angle $\theta$ and by variation of the second beam diameter.

Systems for creating diffraction grating inside laser-induced damage in accordance with the method described above by two coherent beams can be assembled by the known optical equipment. For example, beam splitter, which is needed in the system, can be used like it is disclosed in U.S. Pat. No. 5,786,560 to Tatah et al. However, combination of known devices can give desirable effect (creation of a diffraction grating inside whatever transparent material on basis of breakdown phenomenon) only if all steps of the method disclosed above are made and laser parameter specifications described above are satisfied.

The general advantage of the method with two coherent beams is unavailability of a special space modulator, which changes the space distribution of the second laser beam, and using of well-known holographic apparatus.

Figure 5A:
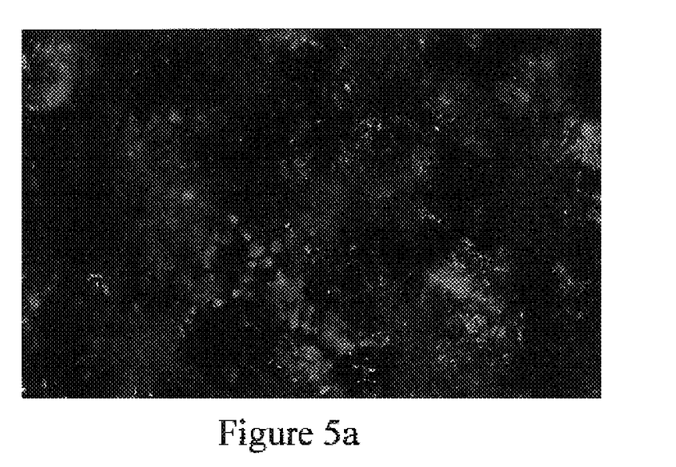
FIG. 5 illustrates iridescent laser-induced damages created by the methods. The damages were produced inside an optically polished, high-index lead oxide cut glass by Nd-YAG laser and, as you see, lay out white light incident upon them into spectrum. The photos were made using a microscope camera with 100× magnification (5a) and 200× magnification (5b).
Figure 5B:
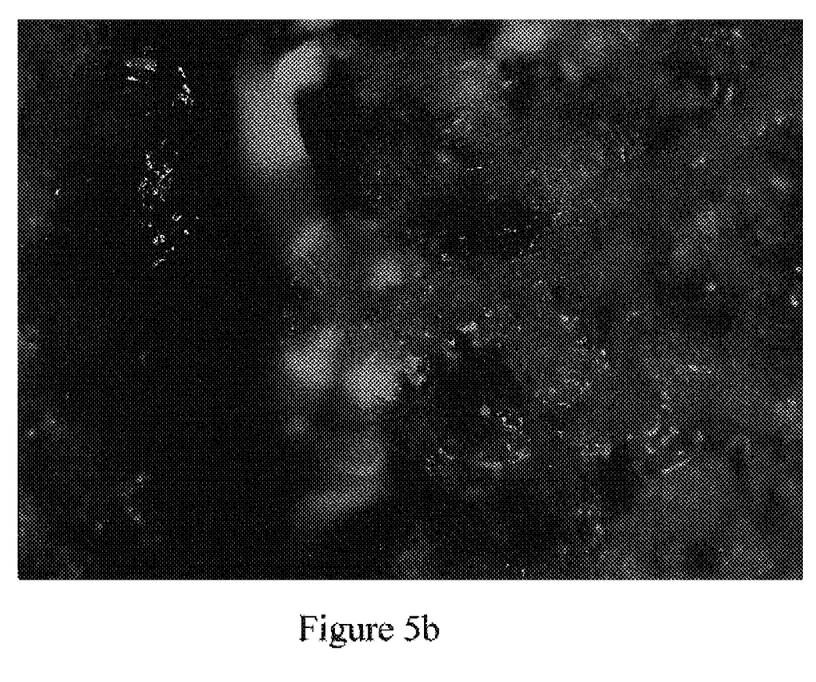

FIG. 5 illustrates iridescent laser-induced damages created by the methods. The damages were produced inside an optically polished, high-index lead oxide cut glass by Nd-YAG laser and, as you see, lay out white light incident upon them into spectrum. The photos were made using a microscope camera with 100× magnification (5a) and 200× magnification (5b).

I claim:

1. A method for production of laser-induced images with special optical characteristics, comprising:

production of laser-induced damages, optical characteristics of which depend on the direction of light illuminating the transparent material;

production of laser-induced damages, the brightness of which are changed depending on the visual angle;

production of iridescent laser-induced damages, which lay out white light incident upon them into spectrum.

2. A method in accordance with claim 1 wherein the laser-induced damages, optical characteristics of which are changed depending of the visual angle and the light direction, are created by their special configuration.

3. A method in accordance with claim 2 wherein the special shape of a laser-induced damage is created by special focusing of laser radiation, comprising:

division of a focal area into two areas (the first area and the second area) so that the first area is essentially larger than the second area; the first area contains the second area; the second area has the form which is desirable for damage shape;

focusing the pulse laser radiation into the first area so that the energy of the said radiation is smaller than the breakdown threshold;

focusing the pulse laser radiation into the second area so that the energy of the said radiation exceeds the breakdown threshold by a negligible manner.

4. A method in accordance with claim 1 wherein the laser-induced damages are formed by the breakdown so that the said damages lay out white light incident upon them into spectrum.

5. A method in accordance with claim 4 wherein a laser-induced damage is an arrangement of separate cracks, which lay out white light incident upon them into spectrum.

6. A method in accordance with claim 1 wherein modulation of optical characteristics of separate image areas is controlled by orientation of laser-induced damages inside said areas.

7. A method in accordance with claim 1 wherein dynamical color variation of laser-induced images is produced by controlling color of light illuminating the transparent material containing the said image.

8. A method in accordance with claim 1 wherein dynamical color variation of laser-induced images is produced by controlling direction of light illuminating the transparent material.

9. A method in accordance with claim 1 wherein a laser-induced damage of a spherical form without star structure is created by special focusing of laser radiation, comprising:

focusing the pulse laser radiation into spherical area, the radius of which is equal to the radius of the laser induced damage;

controlling the energy level of the said laser radiation so that the said level is smaller than the breakdown threshold;

focusing the pulse laser radiation into spherical area, the radius of which is essentially smaller than the radius of the laser induced damage;

controlling the energy of the said radiation focused at the said small spherical area so that the level of the said radiation exceeds the breakdown threshold by a negligible manner.

10. A method in accordance with claim 1 wherein the iridescent etch points are laser-induced damages containing diffraction gratings.

11. A method in accordance with claim 10 wherein diffraction grating inside a laser-induced damage of a transparent material is created by focusing of laser radiation so that laser energy increases breakdown threshold only in separate parallel planes within the said damage area.

12. A method in accordance with claim 10 wherein the said diffraction grating inside a laser-induced damage is created by focusing of two incoherent laser beams, comprising:

division of the basic power laser beam into two laser beams (the first and the second beams);

directing the first laser beam at the pre-determined transparent material area, where laser-induced damage should be created;

determining the energy level of the first laser beam so that it is smaller than the breakdown threshold but it can create the condition for self-focusing;

modulating the second laser beam so that it has areas with two energy levels (the first energy level and the second energy level);

controlling the said first energy level and the said second energy level of the second laser beam so that they are smaller than the breakdown threshold and each of them cannot create the condition for self-focusing;

directing the second laser beam at the said pre-determined transparent material area, where the laser-induced damage should be created;

controlling the angle between the first and the second beams so that to create desirable orientation of diffraction grating inside the laser-induced damage;

determining the total energy level of the first beam and the first energy level of the second beam so that the said total energy level increases the breakdown threshold;

determining the total energy level of the first beam and the second energy level of the second beam so that the said total energy does not increase the breakdown threshold;

controlling the distance between adjacent breakdown areas so that the said distance is larger than the minimal distance under which internal crash of the transparent material is created.

13. A method in accordance with claim 10 wherein the said diffraction grating inside a laser-induced damage is created by focusing of two coherent laser beams, comprising:

division of the basic power laser beam into two laser beams (the first and the second beams) so that the first laser beam has the first energy level and the second laser beam has the second energy level;

focusing the said first beam at the pre-determined transparent material area, where laser-induced damage should be created, so that this focusing area has the same shape as the laser-induced damage;

determining the energy level of the first laser beam so that the said energy level is smaller than the breakdown threshold but it can create the condition for self-focusing;

determining the energy level of the second laser beam so that the said energy level is smaller than the breakdown threshold and it cannot create the condition for self-focusing;

focusing the second laser beam at the said pre-determined transparent material area;

controlling the angle between the first and the second beams so that to create desirable orientation of diffraction grating inside a laser-induced damage;

controlling the total energy level of the laser radiation so that the energy level of the light fringes of the interference pattern inside damage area exceeds the breakdown threshold by a negligible manner, but the energy level of the dark fringes of the said interference pattern is essentially smaller than breakdown threshold;

controlling the distance between adjacent interference fringes so that the said distance is larger than the minimal distance under which internal crash of the transparent material is generated.

14. A method in accordance with claim 10 wherein brightness of a diffraction grating inside a laser-induced damage is controlled by the sizes of the area in which the breakdown is created.

* * * * *